US009369720B2

(12) United States Patent
Ohgose et al.

(10) Patent No.: US 9,369,720 B2
(45) Date of Patent: Jun. 14, 2016

(54) IMAGE CODING APPARATUS AND IMAGE CODING METHOD

(75) Inventors: Hideyuki Ohgose, Osaka (JP); Katsuki Urano, Nara (JP); Kiyofumi Abe, Osaka (JP); Hiroshi Arakawa, Nara (JP); Yuki Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 607 days.

(21) Appl. No.: 13/148,111

(22) PCT Filed: Dec. 28, 2010

(86) PCT No.: PCT/JP2010/007592
§ 371 (c)(1),
(2), (4) Date: Aug. 5, 2011

(87) PCT Pub. No.: WO2011/080925
PCT Pub. Date: Jul. 7, 2011

(65) Prior Publication Data
US 2011/0292998 A1    Dec. 1, 2011

(30) Foreign Application Priority Data
Dec. 28, 2009  (JP) .................................. 2009-298928

(51) Int. Cl.
*H04N 7/32*    (2006.01)
*H04N 19/152*  (2014.01)
(Continued)

(52) U.S. Cl.
CPC ............. *H04N 19/152* (2014.11); *H04N 19/11* (2014.11); *H04N 19/119* (2014.11); *H04N 19/14* (2014.11); *H04N 19/176* (2014.11)

(58) Field of Classification Search
CPC ........................................................ H04N 7/32
See application file for complete search history.

(56) References Cited

U.S. PATENT DOCUMENTS 5,333,012 A *  7/1994  Singhal et al. ........... 375/240.04
7,653,130 B2 * 1/2010  Joyce et al. .............. 375/240.07
(Continued)

FOREIGN PATENT DOCUMENTS

JP    2007-201558    8/2007
JP    2008-22405     1/2008
(Continued)

OTHER PUBLICATIONS

International Search Report issued Feb. 8, 2011 in International (PCT) Application No. PCT/JP2010/007592.
(Continued)

*Primary Examiner* — Kehinde O Abimbola
(74) *Attorney, Agent, or Firm* — Wenderoth, Lind & Ponack, L.L.P.

(57) ABSTRACT

An image coding apparatus and an image coding method allow selecting, according to an image in a macroblock to be coded, a most appropriate intra prediction mode for controlling the amount of generated code. The image coding apparatus includes a block feature quantity calculator which calculates, based on pixel values of pixels in the current macroblock in an input image, statistical information of each of the pixel values; and an intra-prediction block size determiner which determines, based on the calculated statistical information, an intra-prediction block size according to a predetermined reference such that a larger intra-prediction block size is more likely to be selected when a degree of change in the pixel value corresponding to a predetermined direction in the current macroblock is smaller. A encoder which performs intra-prediction coding on the current macroblock, in units of the intra-prediction block having the determined size.

6 Claims, 12 Drawing Sheets

(51) Int. Cl.
  *H04N 19/176* (2014.01)
  *H04N 19/119* (2014.01)
  *H04N 19/11* (2014.01)
  *H04N 19/14* (2014.01)

(56) References Cited

U.S. PATENT DOCUMENTS

| | | | |
|---|---|---|---|
| 8,000,390 B2 * | 8/2011 | Zhao et al. | 375/240.13 |
| 8,155,190 B2 * | 4/2012 | Imamura et al. | 375/240.13 |
| 8,249,154 B2 * | 8/2012 | Chen | 375/240.12 |
| 2006/0209964 A1 * | 9/2006 | Cheng et al. | 375/240.24 |
| 2007/0253484 A1 * | 11/2007 | Zhao et al. | 375/240.13 |
| 2008/0112482 A1 * | 5/2008 | Ueda et al. | 375/240.03 |
| 2008/0159385 A1 * | 7/2008 | Joyce et al. | 375/240.03 |
| 2008/0253454 A1 * | 10/2008 | Imamura et al. | 375/240.13 |
| 2009/0046779 A1 * | 2/2009 | Seok et al. | 375/240.03 |
| 2009/0207907 A1 | 8/2009 | Sato et al. | |
| 2009/0207913 A1 * | 8/2009 | Kim et al. | 375/240.12 |
| 2009/0232207 A1 * | 9/2009 | Chen | 375/240.12 |
| 2010/0020872 A1 * | 1/2010 | Shimizu et al. | 375/240.12 |
| 2010/0284467 A1 * | 11/2010 | Sekiguchi et al. | 375/240.16 |
| 2011/0051801 A1 | 3/2011 | Hwang et al. | |
| 2012/0207211 A1 * | 8/2012 | Song et al. | 375/240.03 |
| 2012/0288009 A1 * | 11/2012 | Sato et al. | 375/240.16 |
| 2012/0288010 A1 * | 11/2012 | Sato et al. | 375/240.16 |
| 2012/0288011 A1 * | 11/2012 | Sato et al. | 375/240.16 |

FOREIGN PATENT DOCUMENTS

| | | |
|---|---|---|
| JP | 2009-232324 | 10/2009 |
| WO | 2008/044658 | 4/2008 |
| WO | 2009/093879 | 7/2009 |

OTHER PUBLICATIONS

ITU-T H. 264 Standard, Advanced video coding for generic audio-visual services 9. Parsing Process, published on Mar. 2005.

* cited by examiner

FIG. 6
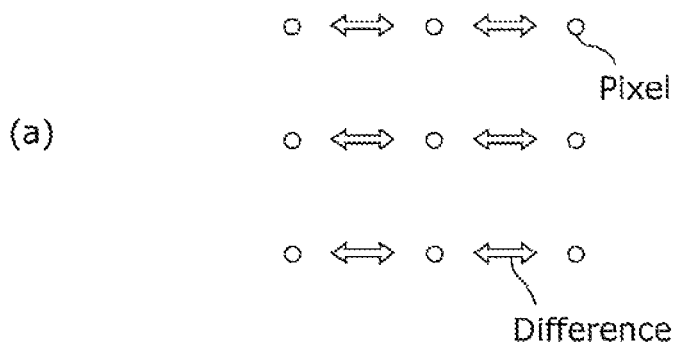
(a)
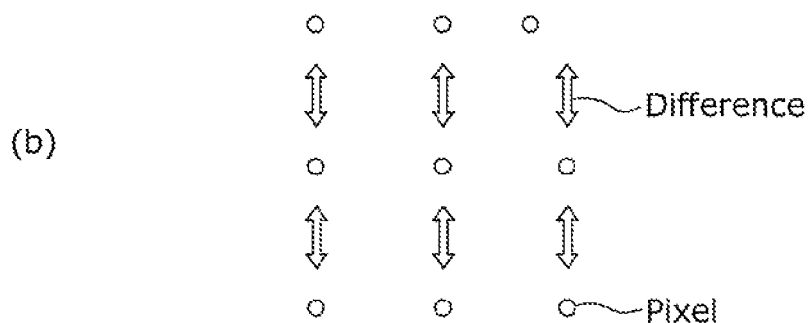
(b)

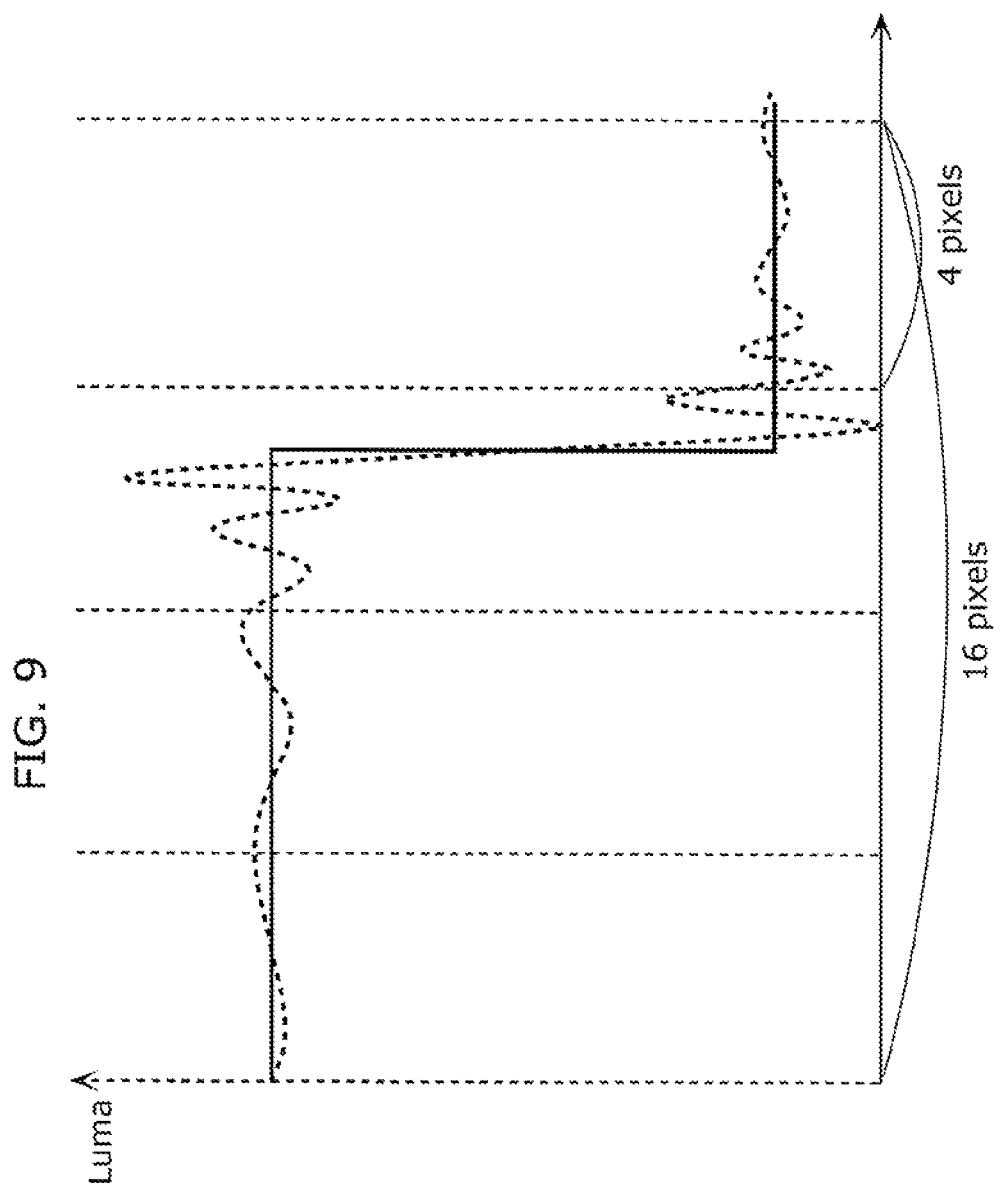

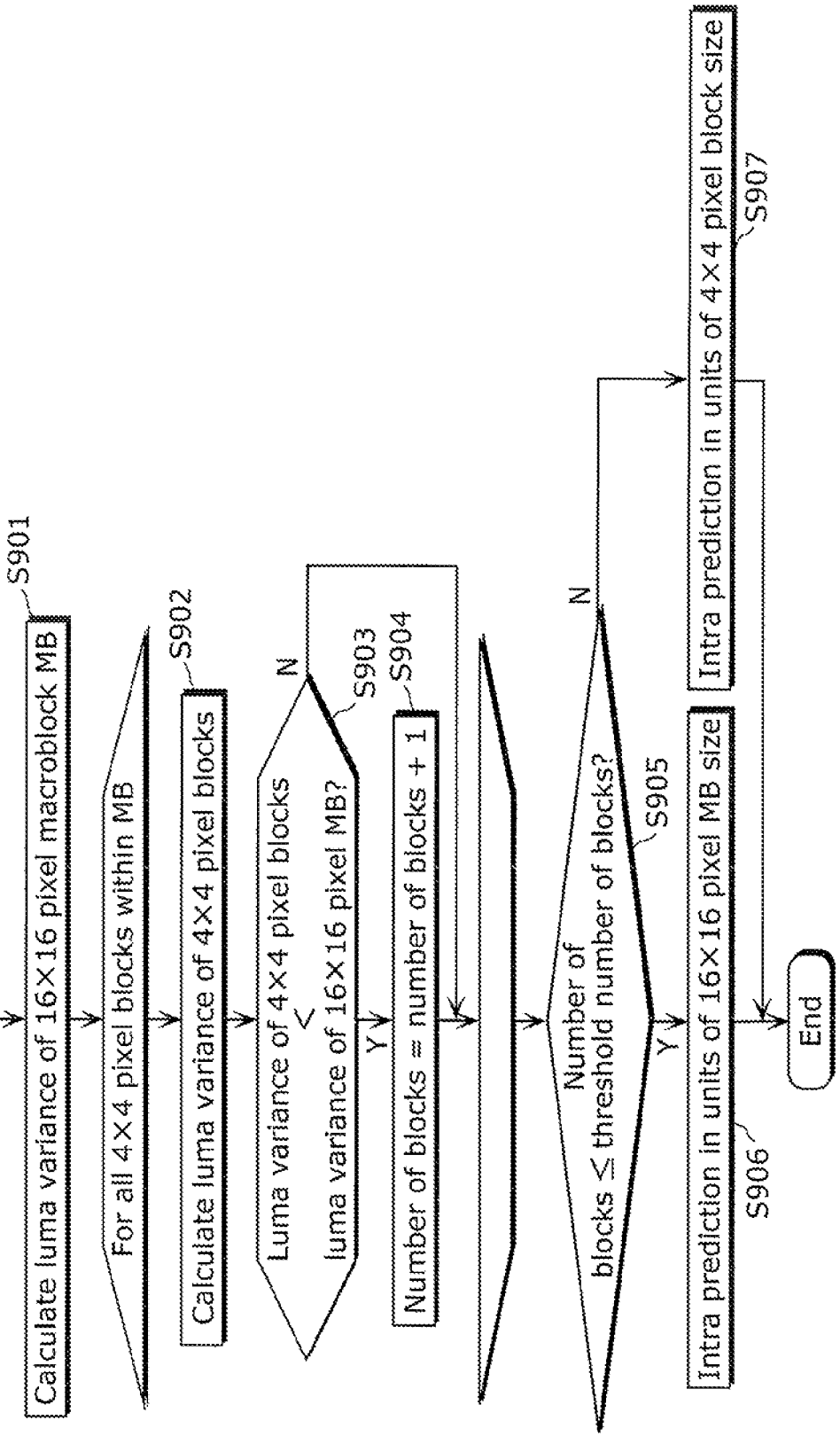

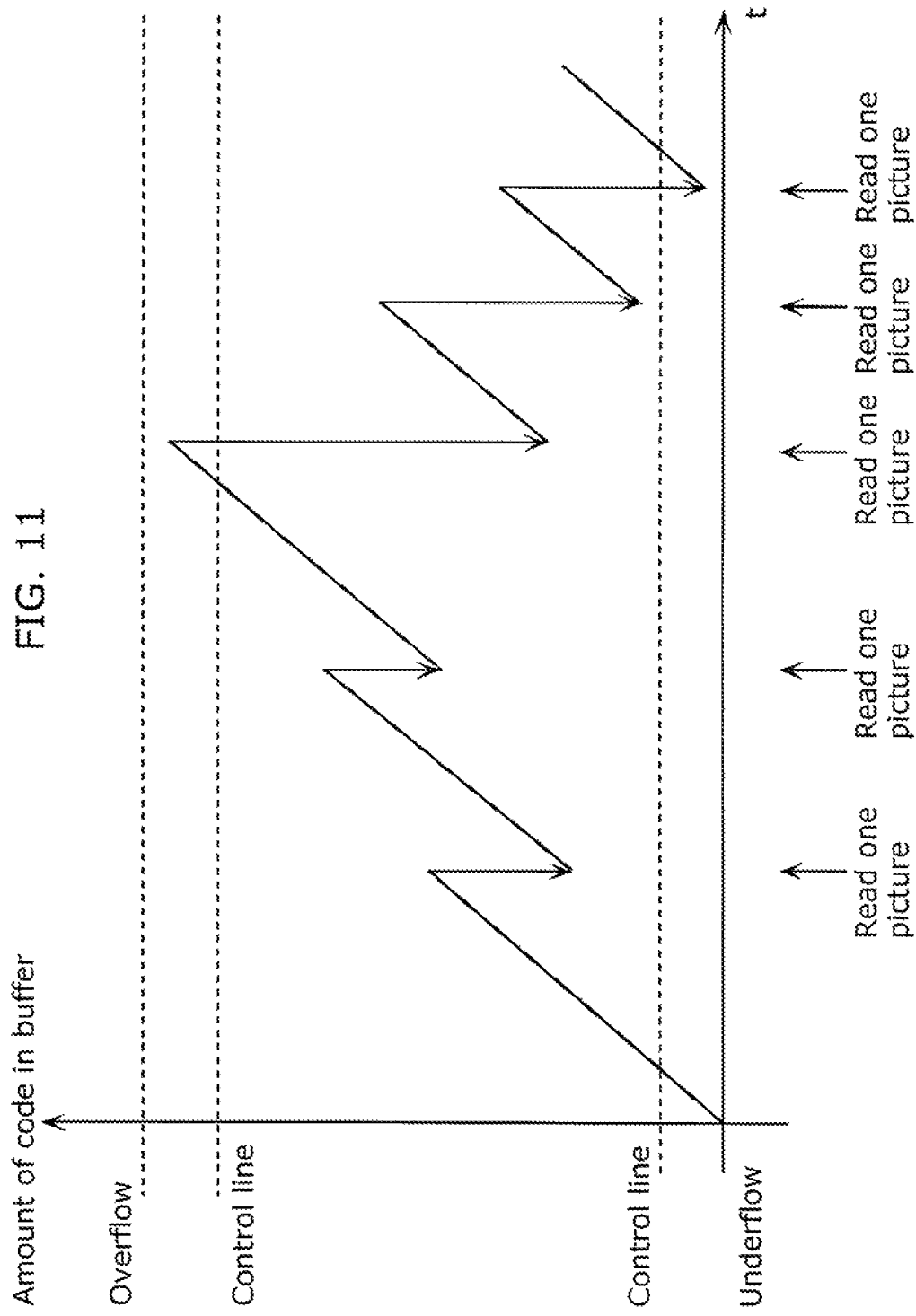

IMAGE CODING APPARATUS AND IMAGE CODING METHOD

BACKGROUND OF THE INVENTION

Technical Field

Background Art

The present invention relates to an image coding apparatus which performs coding in accordance with H.264 schemes and an image coding method used for the image coding apparatus.

In recent years, a recording system using H.264 which offers a higher coding efficiency than the conventional MPEG-2 has become a mainstream scheme for coding high-definition video using a recoding apparatus such as a BD recorder and an imaging device such as a camcoder.

In H.264, as described in Non-Patent Literature 1, an intra-prediction coding method is adopted. In the intra-prediction coding method, coding is performed on: information on (1) prediction block size and (2) prediction direction (these are collectively described as "prediction mode"); and (3) a residual signal between a block image and a prediction image. Furthermore, Baseline profile and Main profile in H.264 specify two types of prediction block sizes to be a unit for intra-prediction coding: a 16×16 pixel block that is a unit of macroblock to be coded and a 4×4 pixel block that is a unit of orthogonal transform, and only an 8×8 pixel block is specified for chroma signal. FIG. 12 is a diagram showing a prediction mode according to the intra-prediction coding method specified by Baseline profile of H.264. FIG. 12($a$) is a diagram showing a prediction mode of the 4×4 pixel block, and FIG. 12($b$) is a diagram showing a prediction mode of the 16×16 pixel block. For the prediction direction, as shown in FIG. 12($a$), nine prediction directions are specified for the prediction based on the 4×4 pixel block in a luma signal, including an average prediction. In addition, as shown in FIG. 12($b$), for prediction based on the 16×16 pixel block in the luma signal and the 8×8 pixel block in the chroma signal, four prediction directions are specified, and one of the directions are selected according to each prediction block. An amount of information regarding the prediction direction required for one macroblock increases or decreases depending on the size of the prediction block: accordingly, the number of prediction blocks increases as the prediction block size increases, thus causing increase in the amount of information.

In coding based on H.264, it is necessary to control an amount of generated code such that the amount of the code does not exceed an upper limited of an amount of code that is systematically designed, and various control methods have been suggested. Suggested as one of the methods is a method of fixing the prediction size for the intra-prediction to the 16×16 pixel block when the next picture coding amount is about to exceed the upper limit, and fixing the prediction direction to the prediction of a peripheral pixel, to thereby suppress the amount of generated code (See Patent Literature 1).

CITATION LIST

Patent Literature

[PTL 1] Japanese Unexamined Patent Application Publication No. 2008-22405.

Non Patent Literature

[NPL 1] ISO/IEC 14496-10: 2005

SUMMARY OF INVENTION

In coding an image, it is necessary to control the amount of generated code as described earlier, and normally, the amount of generated code is controlled by controlling a quantization parameter. However, to drastically suppress the amount of generated code, simply increasing the quantization parameter is not sufficient in some cases. To suppress the amount of generated code, it is necessary to reduce information other than the information of the image signal (hereinafter, described as an "overhead").

Thus, Patent Literature 1 described above discloses a method of suppressing the amount of code by reducing the overhead of the intra-prediction coding. However, for example, in the case of an input image having a checked pattern for each pixel, although it is possible to reduce the overhead by fixing the prediction mode to the 16×16 pixel block prediction mode which does not allow a diagonal prediction, the residual component becomes significantly large due to a complete failure in the prediction, thus failing to suppress the amount of code. Alternatively, significant deterioration is caused in image quality when the quantization parameter is increased to suppress the amount of code.

Thus, an object of the present invention which is conceived in view of the above circumstances is to provide an image is coding apparatus and an image coding method which allow suppressing deterioration in image quality irrespective of the pattern of the input image and selecting the most appropriate intra-prediction mode for suppressing the amount of generated code in the intra-prediction coding.

To solve the problem described above, an image coding apparatus according to an aspect of the present invention is an image coding apparatus which performs intra-prediction coding on a macroblock to be coded in an input image, in units of an intra-prediction block in a plurality of sizes, and the image coding apparatus includes: a feature quantity calculating unit which calculates, based on pixel values of pixels in the current macroblock in the input image, statistical information of each of the pixel values; a size determining unit which determines, based on the calculated statistical information, an intra-prediction block size according to a predetermined reference such that a larger intra-prediction block size is more likely to be selected when a degree of change in the pixel value corresponding to a predetermined direction in the current macroblock is smaller; and a coding unit which performs the intra-prediction coding on the current macroblock, in units of the intra-prediction block having the determined size.

Note that the present invention can be realized not only as an image coding apparatus but also as: a cellular information terminal or broadcasting apparatus which includes the image coding apparatus; a method which includes, as steps, processing units included in the image coding apparatus; as a program causing a computer to execute these steps; a recording medium such as a computer-readable CD-ROM on which the program is recorded; and information, data, or a signal representing the program. Moreover, such program, information, data, and signal as these may be distributed through a communication network such as the Internet.

According to the present invention as described above, irrespective of the image pattern of the input image, it is possible to select the most appropriate intra-prediction mode for suppressing the amount of generated code in the intra-prediction coding.

BRIEF DESCRIPTION OF DRAWINGS

FIG. 6 is a conceptual diagram showing a method of calculating a difference in pixel value between adjacent pixels in horizontal and vertical directions.

FIG. 9 is a diagram showing luma that is a residual of each pixel in the case of horizontally scanning the image in the macroblock shown in FIG. 8 at a position of an eighth pixel from the top of the macroblock.

FIG. 10 is a flowchart for describing an example of processing for determining the intra-prediction block size according to a second embodiment.

FIG. 11 is a diagram for describing control of the amount of generated code in a buffer simulation of a decoder according to a third embodiment.

DETAILED DESCRIPTION OF INVENTION

Hereinafter, embodiments of the present invention will be described with reference to the drawings. Note that although the present invention is described using the following embodiments and the attached drawings, this is simply intended for illustration and is not intended for limiting the present invention to these embodiments and drawings. In addition, it goes without saying that a combination of respective technical contents to be shown in these embodiments are included in the present invention.

Embodiment 1

Figure 1:
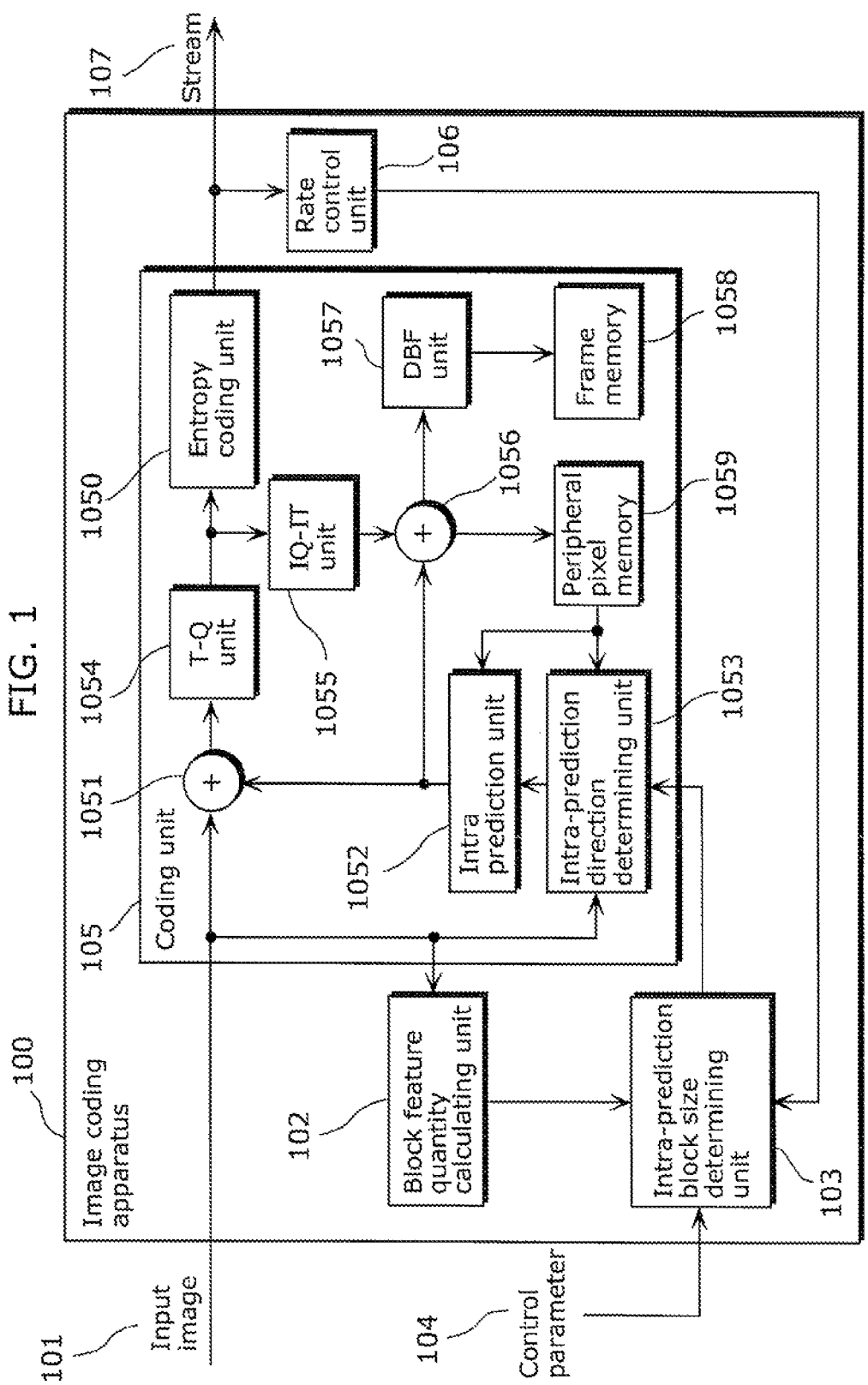
FIG. 1 is a block diagram showing a configuration of an image coding apparatus according to a first embodiment of the present invention.

FIG. 1 is a block diagram showing a configuration of an image coding apparatus according to a first embodiment of the present invention. As shown in FIG. 1, an image coding apparatus 100 includes: a block feature quantity calculating unit 102, an intra-prediction block size determining unit 103, a coding unit 105, and a rate control unit 106. Furthermore, the coding unit 105 internally includes: a subtractor 1051, an intra prediction unit 1052, an intra-prediction direction determining unit 1053, a transformation and quantization (T-Q) unit 1054, an inverse quantization and inverse transformation (IQ-IT) unit 1055, an adder 1056, a deblocking filter (DBF) unit 1057, a frame memory 1058, a peripheral pixel memory 1059, and an entropy coding unit 1050. The image coding apparatus 100 is an image coding apparatus which calculates a block feature quantity of an input image 101 obtained from outside, determines in which block size intra-prediction is to be performed on the input image 101, using the calculated block feature quantity and a control parameter 104 that is an input from outside and is set in a resister or memory that is provided outside, intra-predicts the input image 101 based on the determined block size, and outputs a stream 107 by further coding the input image 101 that is intra-predicted. Here, the block feature quantity is statistical information of the pixel value and is, in terms of luma, for example, a variance, a mean, a sum of differences between adjacent pixels, a sum of absolute differences between adjacent pixels, and a dynamic range. Note that in FIG. 1, the description of a configuration of a processing unit irrelevant to inter prediction, for example, a processing unit which performs inter prediction is omitted because the present invention is focused on processing in intra prediction.

The present embodiment is premised on the coding based on Baseline profile or Main profile in H.264. In the case of Baseline profile or Main profile of H.264, the intra-prediction block size for a luma signal is either 16×16 pixels or 4×4 pixels. In addition, according to the present embodiment, the technique of determining the mode for intra prediction is premised on a technique of determining a prediction direction after determining the block size. In other words, the 8×8 pixel block size for the luma signal, which is used for High profile of H.264, is not used. In addition, to focus on the description of the coding processing using intra prediction, the description regarding the coding processing using inter prediction will be omitted.

According to H.264, the input image 101 corresponding to one picture is sequentially divided into rectangular regions (macroblock hereinafter described as "MB") of 16×16 pixels, and coding is performed in units of MB resulting from the division.

The block feature quantity calculating unit 102 calculates a feature of an MB to be coded, that is, a block feature quantity representing a tendency of change in pixel value in the MB. The block feature quantity calculating unit 102 outputs, as the block feature quantity, for example, a mean, a variance, a dynamic range, and a sum of absolute differences between adjacent pixels in terms of luma, in units of MB (16×16 pixels) or in units of orthogonal transform block (4×4 pixels), and outputs as the block feature quantity. Note that according to the first embodiment, the block feature quantity calculating unit 102 calculates the block feature quantity in units of MB.

For example, a mean of luma a' can be calculated according to (Expression 1) below. However, M represents the number of pixels in a horizontal direction in a block, N represents the number of pixels in a vertical direction in the block, i represents an integer having a value that increments by one from 1 to N, j represents an integer having a value that increments by one from 1 to M, and a(i, j) represents a luma of a pixel in i row and j column. Here, N=M=16. The block feature quantity calculating unit 102 calculates the mean of luma a' of each block by performing calculation according to (Expression 1) for each block. Note that the calculation using a computer according to the equation as below is a known technique, and therefore the description of specific processing of the calculation is omitted.

[Math. 1]

$$a' = \frac{1}{N*M}\sum_{i=1}^{N}\sum_{j=1}^{M}a(i,j)$$ (Expression 1)

In addition, it is possible to calculate a luma variance $S^2$ according to (Expression 2) below. In (Expression 2), M represents the number of pixels in the horizontal direction in the block, N represents the number of pixels in the vertical direction in the block, a' is the mean of luma, a(i, j) represents a luma of a pixel in i row and j column, i represents an integer having a value that increments by one from 1 to N, and j represents an integer having a value that increments by one from 1 to M. The block feature quantity calculating unit 102 calculates the luma variance $S^2$ of each block by performing the calculation according to (Expression 2) on each block.

[Math. 2]

$$S^2 = \frac{1}{N*M}\sum_{i=1}^{N}\sum_{j=1}^{M}\{a(i,j)-a'\}^2$$ (Expression 2)

Furthermore, as the block feature quantity, in terms of luma, for example, the dynamic range is calculated as a difference between a maximum value and a minimum value of luma or a ratio (dB) between the minimum and maximum values of luma.

In addition, for example, $a_h$ that is a sum of absolute differences between adjacent pixels in the horizontal direction (row direction) is calculated according to (Expression 3) below, and $a_v$ that is a sum of absolute differences between adjacent pixels in the vertical direction (column direction) is calculated according to (Expression 4) below. Note that in (Expression 3) and (Expression 4), K represents the number of pixels along a side of the block, and a(i, j) represents a luma of the pixel located in the i row and j column in the block. In (Expression 3), i represents an integer having a value that increments by one from 1 to K, and j represents an integer having a value that increments by one from 1 to (K−1). In (Expression 4), i represents an integer having a value that increments by one from 1 to (K−1), and j represents an integer having a value that increments by one from 1 to K.

[Math. 3]

$$a_h = \sum_{i=1}^{K}\sum_{j=1}^{K-1}|a(i,j)-a(i,j+1)|$$ (Expression 3)

[Math. 4]

$$a_v = \sum_{i=1}^{K-1}\sum_{j=1}^{K}|a(i,j)-a(i+1,j)|$$ (Expression 4)

The intra-prediction block size determining unit 103 determines the intra-prediction block size to be either 4×4 or 16×16, using the block feature quantity calculated by the block feature quantity calculating unit 102, the control parameter 104 that is input from the outside, and the rate control information calculated by the rate control unit 106 to be described later. The details will be described later.

The coding unit 105 performs coding according to Baseline profile or Main profile of H.264.

Figure 12A:
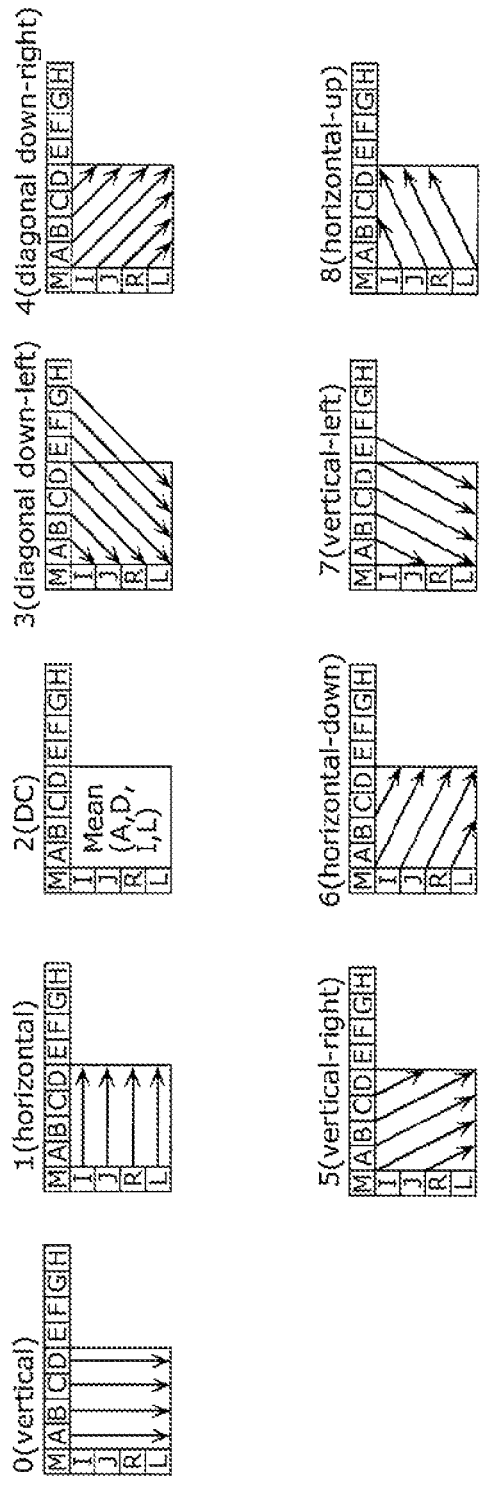
FIG. 12 is a diagram showing a prediction mode for the intra-prediction coding method specified by Baseline profile in H. 264.
Figure 12B:
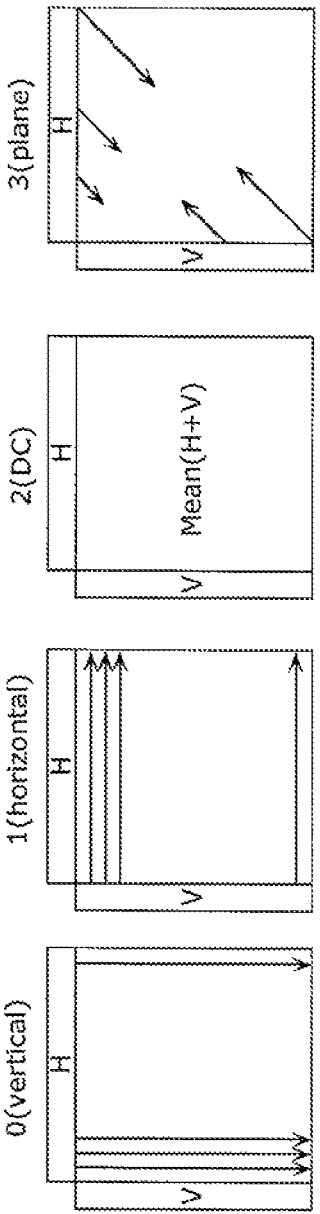

When the intra-prediction block size is 16×16, the intra-prediction direction determining unit 1053 selects one prediction direction per MB, from among four prediction directions from mode 0 to mode 3 as shown in FIG. 12(b). When the intra-prediction block size is 4×4, the intra-prediction direction determining unit 1053 selects one prediction direction for each 4×4 pixel block, from among nine prediction directions from mode 0 to mode 8 as shown in FIG. 12(a). When the block size is 4×4, 16 blocks of 4×4 pixels are included in each MB, and it is necessary to determine the prediction direction for each of the blocks. The technique of determining the prediction direction is not specified here, but a general method is, for example, a method of selecting a prediction direction in which the sum of absolute differences in pixel value between pixels in the block and pixels in the prediction image is smallest.

The intra prediction unit 1052, as shown in FIG. 12(a) and FIG. 12(b), generates a prediction image using a peripheral pixel of the current block, according to the intra-prediction block size determined by the intra-prediction block size determining unit 103 and the prediction direction determined by the intra-prediction direction determining unit 1053. Non-Patent Reference 1 describes details of the generation method.

The subtractor 1051 generates a difference image between the image of the current MB and the prediction image generated by the intra prediction unit 1052.

The T-Q unit 1054 performs quantization after orthogonal transforming the difference image, to calculate a quantization coefficient. For orthogonal transform, for example, discrete cosine transform (DCT) is used. Furthermore, the T-Q unit 1054 calculates the quantization coefficient by quantizing an orthogonal transform coefficient calculated by the orthogonal transform.

The entropy coding unit 1050 outputs a stream 107 after coding: the quantization coefficient calculated by the T-Q unit 1054; and side information (also referred to as "additional information") such as a quantization parameter used for the quantization (also referred to as a "quantization step"), the block size for intra prediction, and the prediction direction of each block.

Using the quantization coefficient calculated by the T-Q unit 1054, local decoding processing for reconstructing an image is performed in the following manner.

The IQ-IT unit 1055 performs inverse quantization and inverse orthogonal transform on the quantization coefficient, to generate a reconstructed difference image. Note that the IQ-IT unit 1055 performs inverse discrete cosine transform (IDCT transform) that is processing inverse to the DCT transform performed by T-Q unit 1054.

The adder 1056 adds the reconstructed difference image generated by the IQ-IT unit 1055 to the predictive image generated by the intra prediction unit 1052, to generate a reconstructed image.

The DBF unit 1057 performs deblocking filtering on the reconstructed image, to generate a reconstructed filtered image.

On the other hand, in H.264, intra prediction is performed using a peripheral pixel of the block on which the intra prediction is to be performed, and it is specified that a pixel that is not yet deblocking-filtered should be used. Accordingly, the peripheral pixel memory 1059 holds only pixels that can be used for intra prediction among pixels included in the reconstructed image.

The frame memory 1058 holds the reconstructed filtered image generated by the DBF unit 1057, as a reference image for performing inter prediction.

The rate control unit 106 calculates, from the result of the coding performed by the coding unit 105, an average quantization parameter, a transition in the amount of generated code, an occupancy status of a buffer, and so on as rate control information, and determines a target amount of code, a quantization parameter, and so on for coding the next input image.

Here, the relationship between the intra prediction mode and the amount of code is described. In the 4×4 intra prediction mode, intra prediction is performed in units of 4×4 pixel blocks, thus allowing intra prediction in further detail compared to intra prediction in units of 16×16 pixel blocks. Furthermore, it is also possible to select one of the nine prediction directions for each of the 4×4 pixel blocks, thus improving prediction performance and producing an advantageous effect of reducing a residual component of pixel values. However, each MB includes 16 blocks of 4×4 pixels, and it is necessary to embed, within a stream, information indicating the prediction direction for each block, thus having a disadvantage of increasing the overhead. On the other hand, the 16×16 intra prediction mode is for performing intra prediction in units of 16×16 pixel blocks, so that the mode allows reducing the residual component in an MB having a smooth pixel value or an MB having an edge in a horizontal or vertical direction, but the mode has a disadvantage of increasing the residual component in an image other than this. Here, having the smooth pixel value means having a small variation in pixel value, that is, a small variation width in pixel value, which means that the image is smooth. However, unlike the 4×4 intra prediction, since only one piece of prediction direction information is sufficient per MB, there is an advantage of reducing overhead. By selecting an appropriate size according to a feature of the image of the current MB, it is possible to maintain the image quality while suppressing the amount of code. In addition, since a high frequency component of an orthogonal transform coefficient is further reduced, that is, the pixel value of the difference image becomes smoother as the quantization parameter increases (becomes rougher), it is more advantageous to select the 16×16 intra prediction mode in terms of suppressing the amount of generated code. However, when the pixel value has little correlation with peripheral pixels and therefore does not allow sufficient reduction of the high frequency component, or when, for example, predicting the pixel image in the MB from a diagonal direction is effective as with the case of the image having a checked pattern in black and white, it is more advantageous, in terms of suppressing the amount of generated code, to select the 4×4 intra prediction mode than selecting the 16×16 intra prediction mode, because the 4×4 intra prediction mode allows further reducing the residual component.

Figure 2:
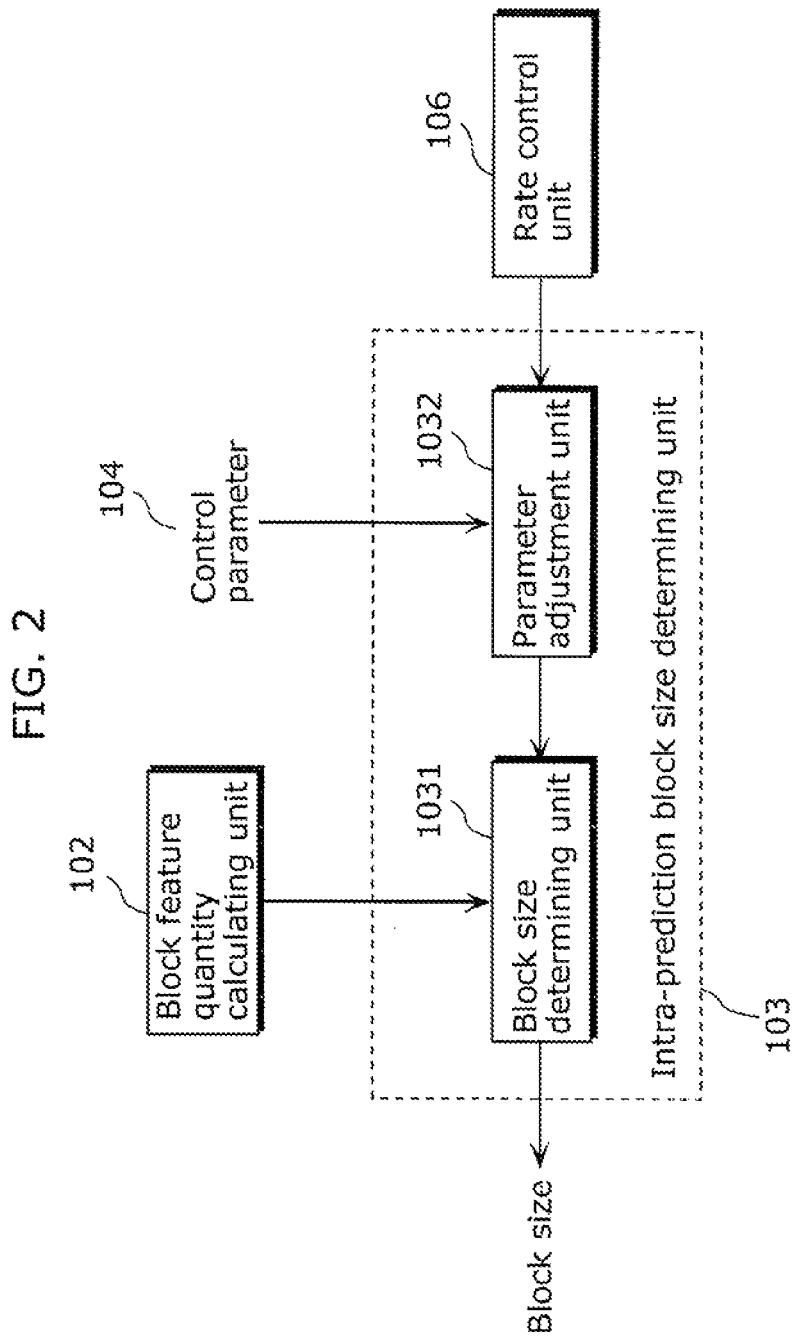
FIG. 2 is a block diagram showing a detailed configuration of the intra-prediction block size determining unit shown in FIG. 1.
Figure 3:
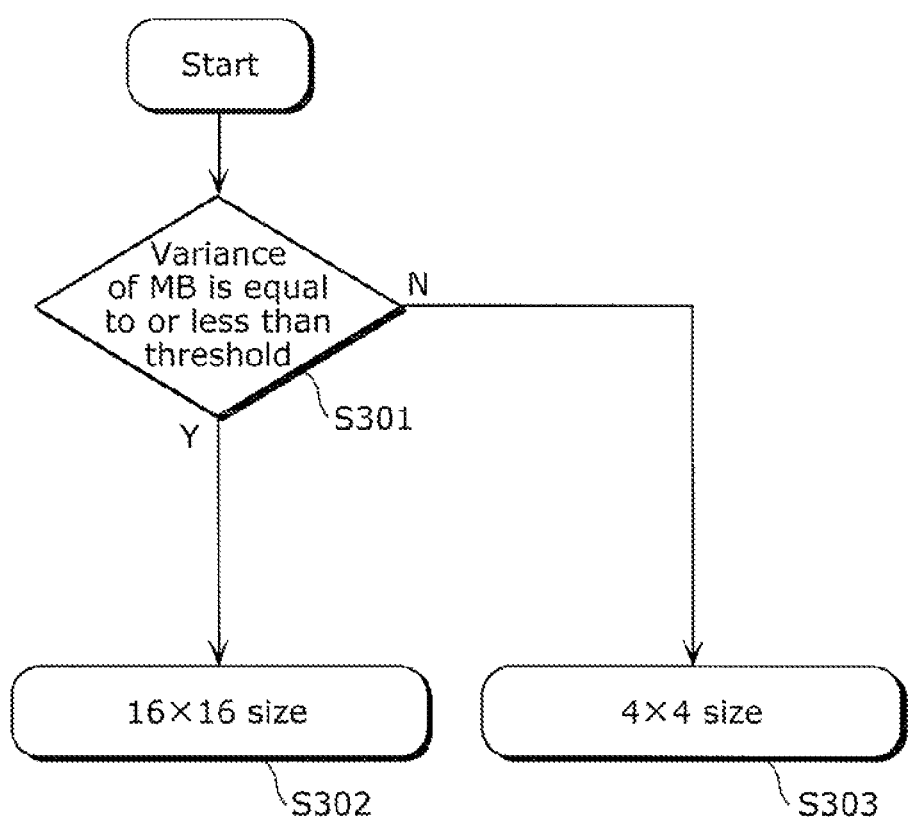
FIG. 3 is a flowchart for describing an example of processing for determining an intra-prediction block size in the first embodiment.

FIG. 2 is a block diagram showing a detailed configuration of the intra-prediction block size determining unit shown in FIG. 1. Next, the intra-prediction block size determining unit 103 is described in detail with reference to FIG. 2. As shown in FIG. 2, the intra-prediction block size determining unit 103 includes a block size determining unit 1031 and a parameter adjustment unit 1032. The block size determining unit 1031 determines the prediction block size by comparing, with the threshold, a luma variance, for example, as a feature quantity for determining the prediction block size. FIG. 3 is a flowchart for describing an example of processing for determining the intra-prediction block size in the present embodiment. FIG. 3 shows a flowchart of the processing for determining the prediction block size. The block size determining unit 1031 compares, with the threshold, the luma variance of the MB that is calculated by the block feature quantity calculating unit 102 using (Expression 2) where M=N=16 (S301), and when the luma variance of the MB is equal to or less than the threshold (Yes in S301), the block size unit 1031 selects the 16×16 pixel block as the prediction block size, based on a determination that the MB to be coded has a smooth luma (S302), and in other cases (No in S301), the block size determining unit 1031 selects the 4×4 pixel block (S303).

Figure 4:
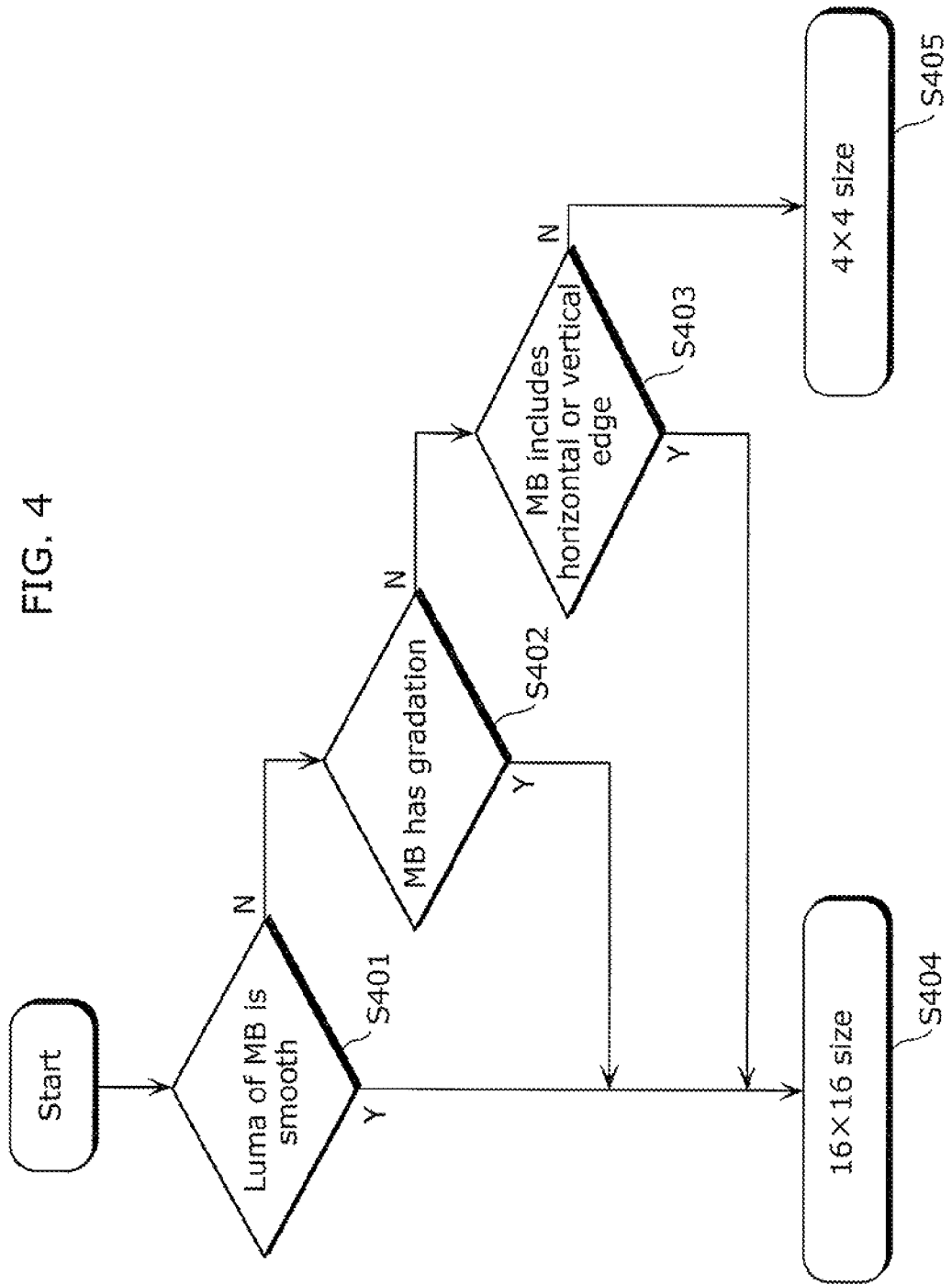
FIG. 4 is a flowchart for describing another example of processing for determining the intra-prediction block size in the first embodiment.

FIG. 3 has described one of the simplest examples of determining whether or not the luma of the MB is smooth by comparing the luma variance with the threshold, and determining the prediction block size according to the result of the determination. However, in order to suppress the amount of generated code more accurately, it is preferable to determine the block size considering the edge direction or gradation of the input image. FIG. 4 is a flowchart for describing an example of processing for determining the intra-prediction block size in the present embodiment. The block size determining unit 1031 first determines whether or not the luma of the MB is smooth (S401). Note that the method of determining the block size determining unit 1031 in step S401 is the same as step S301 in FIG. 3. In other words, the block size determining unit 1031 compares, with the threshold, the luma variance of the MB which is calculated by the block feature quantity calculating unit 102, and determines that the luma of the MB is smooth when the luma variance is equal to or less than the threshold. When the luma variance exceeds the threshold, it is determined that the luma of the MB is not smooth.

The block size determining unit 1031, when determining that the luma of the MB is smooth (Yes in S401), selects the 16×16 pixel block for the prediction block size (S404), and in other cases (No in S401), determines whether or not the MB has gradation (S402). The determination on gradation will be described later in detail with reference to FIGS. 5 and 6.

The block size determining unit 1031, when determining that MB has gradation (Yes in S402), selects the 16×16 pixel block for the prediction block size (S404), and in other cases (No in S402), further determines whether or not the MB includes an edge in the horizontal or vertical direction (S403). Details of the determination on whether or not an edge is included will be described later with reference to FIG. 5.

The block size determining unit 1031, when determining that the MB includes an edge in the horizontal or vertical direction (Yes in S403), selects the 16×16 pixel block for the prediction block size (S404), and in other cases (No in S403), selects the 4×4 pixel block for the prediction block size (S405).

First, the method of determining whether or not the MB includes an edge in the vertical or horizontal direction will be described.

Figure 5:
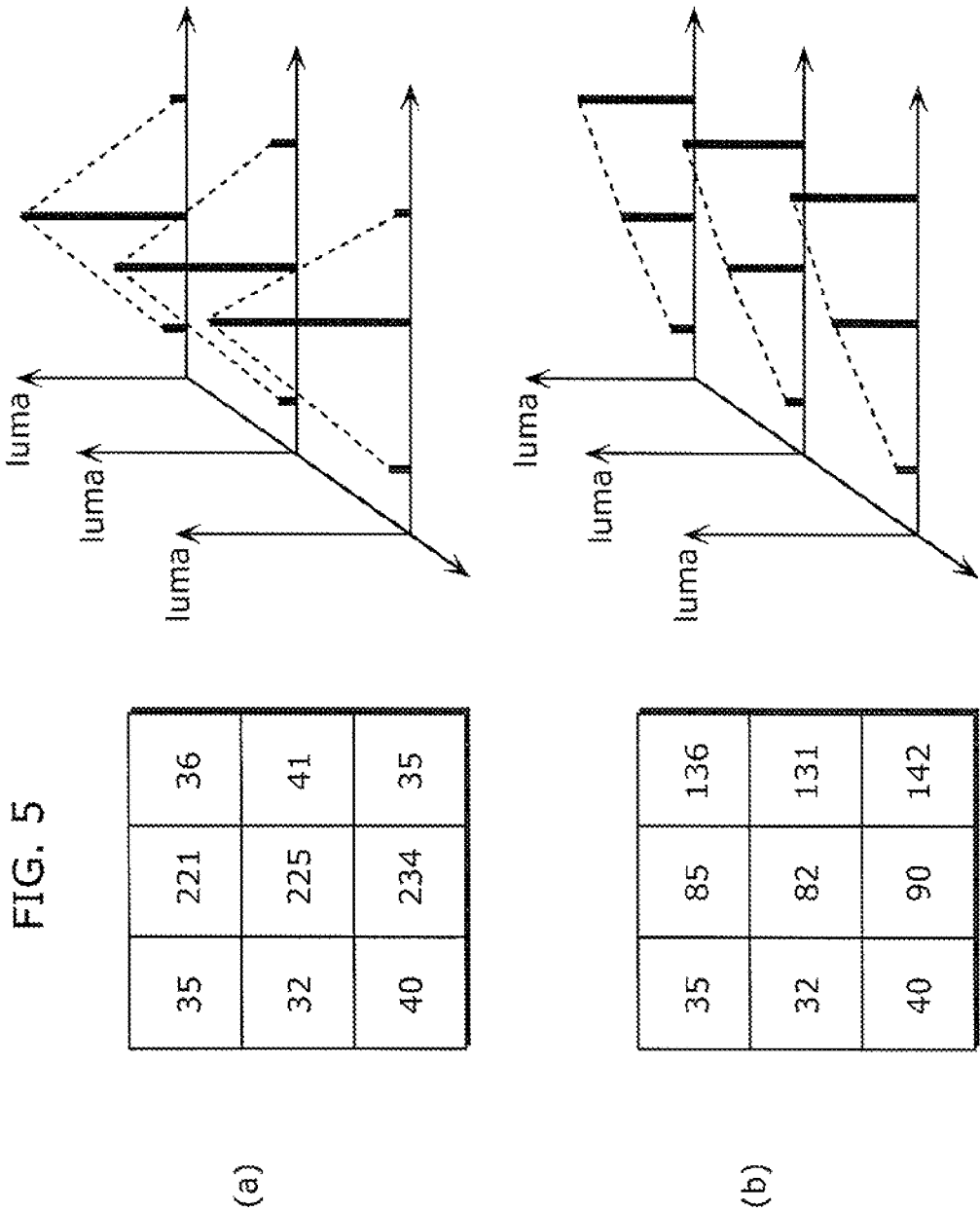
FIG. 5 is a diagram showing variation in pixel value, which represents an edge or gradation.

FIG. 5 is a diagram showing variation in pixel value, which represents an edge or gradation. FIG. 5(*a*) is a diagram showing an example of an edge in luma variation, using a 3×3 pixel block as an example. FIG. 5(*a*) left represents the luma of each pixel in the block using numerical values. Here assumed is the case of using a value from 16 to 235 with accuracy of 8 bits as specified by BT. 709 schemes. FIG. 5(*a*) right represents, in a bar graph, the luma variation of each pixel in the block shown in FIG. 5(*a*) left, with a vertical axis representing the luma. When the MB includes an edge, the luma rapidly changes in a direction perpendicular to the edge direction, between an adjacent pixel and a pixel corresponding to the edge. Furthermore, in the edge direction, adjacent pixels have similar pixel values. For example, as shown in the graph in FIG. 5(*a*) right, the pixels in the second column, as compared to the pixels in the first column, have luma that rapidly changes and is closer to the maximum value of luma. In addition, the luma of the pixels in the second column has almost the same value in a column direction. Accordingly, it is shown that the pixels in the second column correspond to the edge. Note that FIG. 5(a) describes an example of an edge having a width of one pixel in a vertical direction, but even in the case of a third column having the same value as the second column, the pixels in the second column correspond to the edge.

In the case of an edge, the difference in luma between adjacent pixels is almost 0 in the edge direction, and the difference in luma between adjacent pixels is significantly large in a direction perpendicular to the edge. Such a feature of the edge can be detected using the sum of absolute differences between adjacent pixels in vertical and horizontal directions that is calculated by the block feature quantity calculating unit 102. In other words, as shown in FIG. 5(a) right, when the edge is included in the vertical direction, a sum of absolute differences between adjacent pixels in the vertical direction (column direction) $a_v$ tends to have a value closer to 0, and a sum of absolute differences between adjacent pixels in the horizontal direction (row direction) $a_h$ tends to have a significantly large value. Accordingly, it is possible to determine whether or not the edge is included in the vertical direction, by determining whether the sum of absolute differences between adjacent pixels in the vertical direction $a_v$ is equal to or less than a predetermined threshold $Th_v(a_v)$ and the sum of absolute differences adjacent pixels in the horizontal direction $a_h$ is above a predetermined threshold $Th_v(a_h)$. In contrast, it is possible to determine whether or not the edge is included in the horizontal direction, by determining whether the sum of absolute differences between adjacent pixels in the horizontal direction $a_h$ is equal to or less than a predetermined threshold $Th_h(a_h)$ and the sum of absolute differences between adjacent pixels in the vertical direction $a_v$ is above a predetermined threshold $Th_h(a_v)$.

Next, the method of determining whether or not the MB has gradation will be described.

FIG. 5(b) is a diagram showing an example of gradation in luma variation, using a 3×3 pixel block as an example. FIG. 5(b) left represents the luma of each pixel in the block using a numerical value. FIG. 5(b) right represents, in a bar graph, the luma variation of each pixel in the block shown in FIG. 5(a) left, with a vertical axis representing the luma. When the image in the MB has gradation, the luma (or may be chroma) tends to gradually increase or decrease in one direction. As shown by the graph in FIG. 5(b) right, in the example in FIG. 5(b) left, the luma of each pixel hardly changes in the horizontal direction but gradually increases rightward in the horizontal direction. Such features of edge and gradation can be detected using the sum of absolute differences between adjacent pixels in vertical and horizontal directions that is calculated by the block feature quantity calculating unit 102, or a value that is obtained in the middle of calculating, by the block feature quantity calculating unit 102, the sum of absolute differences between adjacent pixels in vertical and horizontal directions of each MB.

FIG. 6 is a conceptual diagram showing a method of calculating a difference in pixel value between adjacent pixels in horizontal and vertical directions. FIG. 6(a) shows calculating the difference in pixel value between adjacent pixels in the horizontal direction (row direction) as shown by arrows, and FIG. 6(b) shows calculating the difference in pixel value between adjacent pixels in the vertical direction (column direction) as shown by arrows. For luma, the adjacent pixel difference in the horizontal direction is calculated per row within the block. In an equation, a difference in luma between adjacent pixels in the horizontal direction is represented as: $\{a(i,j)-a(i,j+1)\}$. In addition, the adjacent pixel difference in the vertical direction is calculated per column within the block. In an equation, the difference in luma between adjacent pixels in the vertical direction is represented as: $\{a(i,j)-a(i+1,j)\}$.

In the case of gradation, the difference in luma between adjacent pixels tends to constantly have a value closer to 0 in a certain direction and to have an approximately constant value equal to or less than the threshold in a direction perpendicular to the direction. Accordingly, the block size determining unit 1031 detects whether or not there is a direction in which each of the differences in pixel value between adjacent pixels is closer to 0. In other words, the block size determining unit 1031 detects whether or not the degree of variation in pixel value between adjacent pixels is smaller in the vertical or horizontal direction. When such a direction is detected, it is possible to determine whether or not a gradation is included in the vertical or horizontal direction, by determining whether or not a sign of plus or minus of the difference in luma between adjacent pixels in a direction perpendicular to the detected direction is constant, and whether or not the difference in luma between adjacent pixels has a width equal to or less than a predetermined threshold.

Note that FIG. 5(b) has shown the case where the luma of each pixel in the block varies in a linear curve state in the horizontal direction, that is, at a constant angle, but the case is not limited to this, and the luma may vary in a state of a quadratic curve or cubic curve. In addition, here, the determination of gradation has been performed using the difference in luma between adjacent pixels, but the degree of variation in luma in each direction within the block may be calculated using first derivation. In addition, a conventional technique in graphic processing may be used for detecting gradation.

As described above, according to the first embodiment, it is possible to determine the prediction block size not only based on whether or not the luma of the MB is smooth, that is, whether or not variation in luma of the MB is equal to or less than the threshold, but also based on whether or not the MB includes gradation in the horizontal or vertical direction or whether or not the MB includes an edge in a horizontal or vertical direction. This allows selecting the 4×4 pixel block as the prediction block size when there is a problem that the residual component has become significantly large due to a complete failure in the prediction which can be ascribed to selecting the 4×4 pixel block as the prediction block size, and also allows selecting the 16×16 pixel block as the prediction block size only when no such problem occurs, thus producing an advantageous effect of suppressing the amount of generated code with higher accuracy.

This clearly shows that, according to the image coding apparatus 100 in the first embodiment, it is possible to realize a sufficient configuration for solving the conventional problem in intra prediction based on the 16×16 pixel block, using only the coding unit 105, the block feature quantity calculating unit 102, and the intra-prediction block size determining unit 103 that are shown in FIG. 1.

In addition to this, furthermore, according to the first embodiment, in the case of a large amount of generated code, a threshold for determining whether or not the luma of the MB is smooth is set for each picture according to the quantization parameter so that the 16×16 pixel block is more likely to be selected as the prediction block size.

The parameter adjustment unit 1032 adjusts, using the rate control information, the control parameter 104 that is a threshold used for the determination in step S301 in FIG. 3 or S401 in FIG. 4, and generates the threshold for the block size determining unit 1031. For example, the following will describe the case of determining the threshold. A list of thresholds according to the quantization parameter is included in the control parameter 104, and is set on a per-picture basis.

In this case, the parameter adjustment unit 1032 previously holds a list of thresholds as below which vary in conjunction with a quantization parameter (QP) that is an item of the rate control information.

QP≤33 ... threshold 0
33<QP≤39 ... threshold 1
39<QP≤45 ... threshold 2
45<QP ... threshold 3

As described above, by setting the threshold from threshold 0 to threshold 3 such that the threshold increases as the quantization parameter QP increases, that is, such that the threshold 0<threshold 1<threshold 2<threshold 3, it is possible to increase a selection ratio at which the block size determining unit 1031 selects the 16×16 pixel block. In addition, since the upper limit of QP is 51, it is possible to increase, as the QP approaches this upper limit, the selection ratio of the 16×16 pixel block by further increasing an increment in the threshold from threshold 2 to threshold 3.

Figure 7:
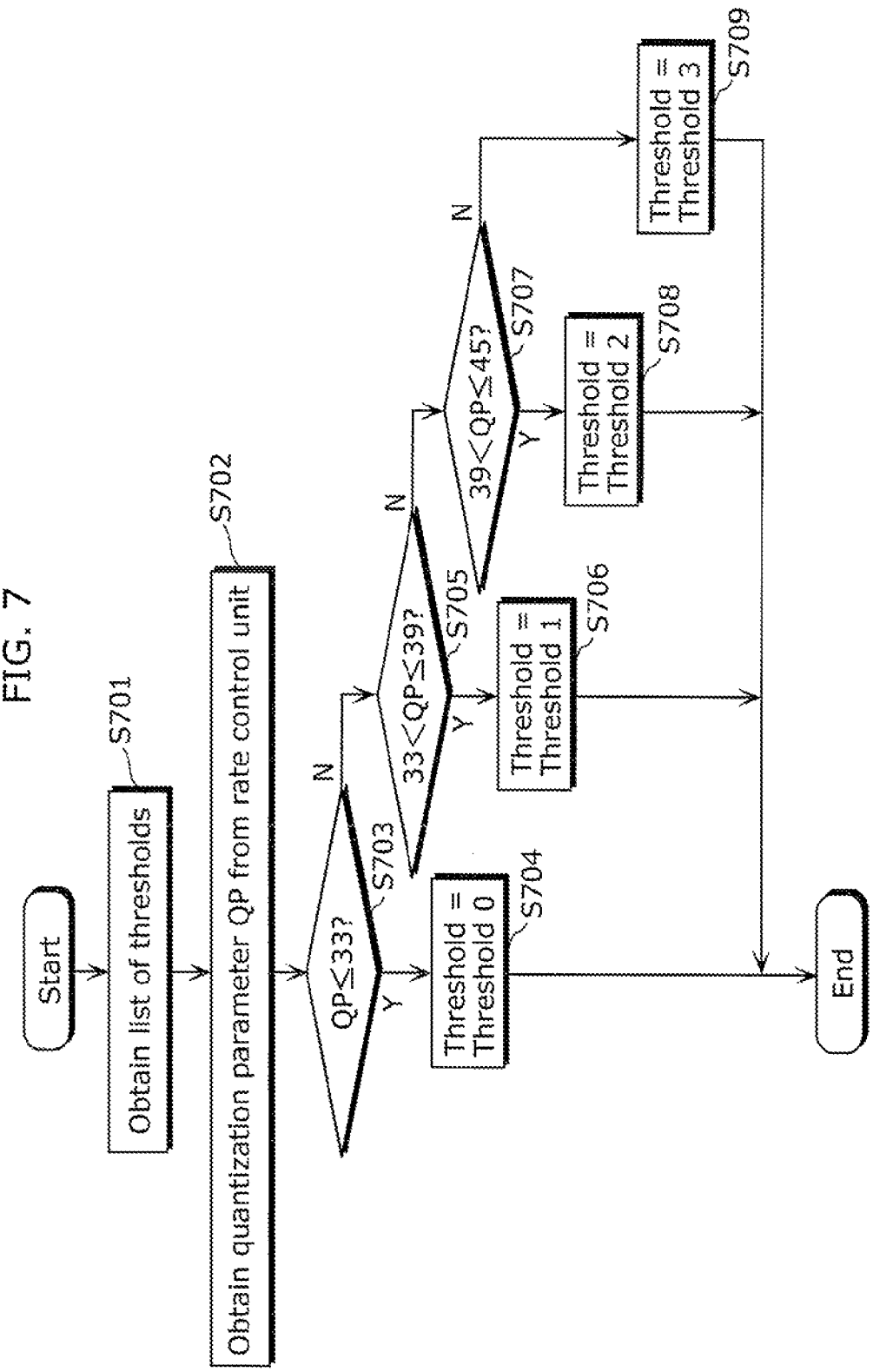
FIG. 7 is a flowchart describing processing for calculating a threshold of luma variance, using thresholds 0 to 3 and a quantization parameter QP.

FIG. 7 is a flowchart describing processing for calculating a threshold of luma variance, using thresholds 0 to 3 and the quantization parameter QP. The parameter adjustment unit 1032, first, obtains the control parameter 104 from a register provided outside, and extracts the list of thresholds included in the control parameter 104 (S701). Next, the parameter adjustment unit 1032 obtains the quantization parameter QP from the rate control unit 106 (S702). The parameter adjustment unit 1032 determines whether or not the value of quantization parameter QP is equal to or less than 33 (S703), and when the value of the quantization parameter QP is equal to or less than 33 (Yes in S703), the parameter adjustment unit 1032 sets: threshold=threshold 0 (S704). In other words, a value "0" is stored in the register for holding a threshold number to identify the threshold determined in step S704.

When the value of the quantization parameter QP is above 33 (No in S703), the parameter adjustment unit 1032 further determines whether or not the value of the quantization parameter QP is equal to or less than 39 (S705), and when the value of the quantization parameter QP is equal to or less than 39 (Yes in S705), the parameter adjustment unit 1032 sets: threshold=threshold 1 (S706).

When the value of the quantization parameter QP is above 39 (No in S705), the parameter adjustment unit 1032 further determines whether or not the value of the quantization parameter QP is equal to or less than 45 (S707), and when the value of the quantization parameter QP is equal to or less than 45 (Yes in S707), the parameter adjustment unit 1032 sets: threshold=threshold 2 (S708).

When the quantization parameter QP is above 45 (No in S707), the parameter adjustment unit 1032 sets: threshold=threshold 3 (S709).

Note that an example of storing, as part of the control parameter 104, a list of the threshold that increases according to an increase in quantization parameter has been described here, but the present invention is not limited to this. For example, for the list of thresholds, a set of a range of the quantization parameter and a previously-calculated threshold may be stored in form of a lookup table or the like on an arbitrary memory, for example, a recording medium or an external memory. In addition, instead of storing the list of thresholds, the threshold may be calculated by previously determining a weight coefficient according to the quantization parameter, and using a linear expression which uses the coefficient according to the quantization parameter or an arithmetic expression represented by another function.

In addition, here, the threshold has been controlled according to the increase in quantization parameter, but the luma variance may be multiplied by the weight coefficient according to the increase in quantization parameter, instead of controlling the threshold, that is, without changing the value of the threshold.

Furthermore, in the embodiment described above, the reference (that is, the list of thresholds) for comparing the threshold and the variance is changed according to increase in quantization parameter, but the present invention is not limited to this; for example, by previously determining the probability of selecting a larger prediction block size according to the variance of pixel values and the increase in quantization parameter, the larger prediction block size may be selected with the probability according to a combination of the variance and the quantization parameter. For example, when setting the probability of selecting the larger prediction block size to 70% when QP is from 40 to 45 or below, the control may be performed such that: for example, natural numbers from 1 to 10 are generated at random, and the larger prediction block size is selected when the generated random value is 1 to 7 or below, and the smaller block size is selected when the value is 8 to 10 or below. Obviously, even when the control is performed as described above, the present invention is not limited to these values given as an example.

In addition, by using a table which specifies the prediction block size corresponding to the luma variance, the reference may be determined such that, even for the same variance, the larger the quantization parameter is, the more likely a larger prediction block size is to be selected. For example, prepared for each predetermined quantization parameter is a table in which the prediction block size to be selected is associated with the luma variance with the current macroblock. In this case, a table is prepared which assigns, as the quantization parameter increases, a larger prediction block size to a smaller variance.

In addition, for another example, instead of changing the threshold in conjunction with the quantization parameter, the threshold may be changed, for example, according to the recording mode or the target amount of code. Specifically, in the recording mode with a lower bit rate for recoding the coded data, the probability of selecting the 16×16 pixel MB size may be increased to reduce the amount of generated code, and in a recording mode with a higher bit rate for recording, the probability of selecting the 4×4 pixel block size may be increased to enhance coding accuracy (resolution). In addition, when the target amount of code is low, the amount of generated code may be increased by increasing the probability of selecting the 16×16 pixel MB size, and when the target amount is high, coding accuracy may be increased by increasing the probability of selecting the 4×4 pixel block size.

Note that in another example of the first embodiment described above, the prediction block size has been determined by detecting both whether or not an edge is included in the horizontal or vertical direction or whether or not a gradation is included in the horizontal or vertical direction, but either edge or gradation may be detected so as to determine the prediction block size.

In addition, as an index to be used in the block size determining unit 1031, a luma variance of the MB has been given as an example, but chroma variance may be used, or it is possible to determine the block size by determining, as shown in FIG. 4, whether or not the pixel value (luma and chroma) is smooth and whether it is a gradation or edge that is included, using a feature quantity such as the sum of absolute differences between adjacent pixels in chroma and the adjacent-pixel difference considering the sign of plus or minus of chroma.

Embodiment 2

The first embodiment above has described a method of determining whether or not the luma of the MB is smooth by comparing the luma variance of the MB with the threshold, and determining the prediction block size based on the result of the determination, but the present invention is not limited to this method. For example, in some cases, when the MB includes a partial image having a high contrast in a background made of a smooth image, it is possible to reduce the amount of generated code by performing intra-prediction coding on each image in a smaller block size rather than by performing intra-prediction coding in the 16×16 pixel MB size. In the second embodiment, in such a case, by comparing the luma variance of the entire 16×16 pixel MB and the luma variance of each of the 4×4 pixel blocks within the MB, the number of 4×4 pixel blocks having a smaller variance than the luma variance of the entire 16×16 pixel MB is counted, and when the counted number is larger than a predetermined number, it is determined that intra prediction is to be performed on the MB in the 4×4 pixel block size.

More specifically, first, as the predetermined number, a threshold Th(n) related to the number of blocks is included in the control parameter 104, to be stored in an external memory. In addition the block feature quantity calculating unit 102 calculates a block quantity amount that is a luma variance here, for not only the MB but also each of the 4×4 pixel blocks. The block size determining unit 1031 compares the luma variance of the MB and the luma variance of each 4×4 pixel block within the MB, and when the luma variance of each 4×4 pixel block is smaller than the luma variance of the MB, the number of the 4×4 pixel blocks is counted. Next, by comparing the number of the 4×4 pixel blocks and the threshold Th(n) related to the block number, which is read out from the control parameter 104, the 4×4 pixel block is selected as the prediction block size when the number of the 4×4 pixel blocks is above the threshold Th(n), and the 16×16 pixel block is selected as the prediction block size when the counted number of the 4×4 pixel blocks is equal to or less than the threshold Th(n).

Figure 8:
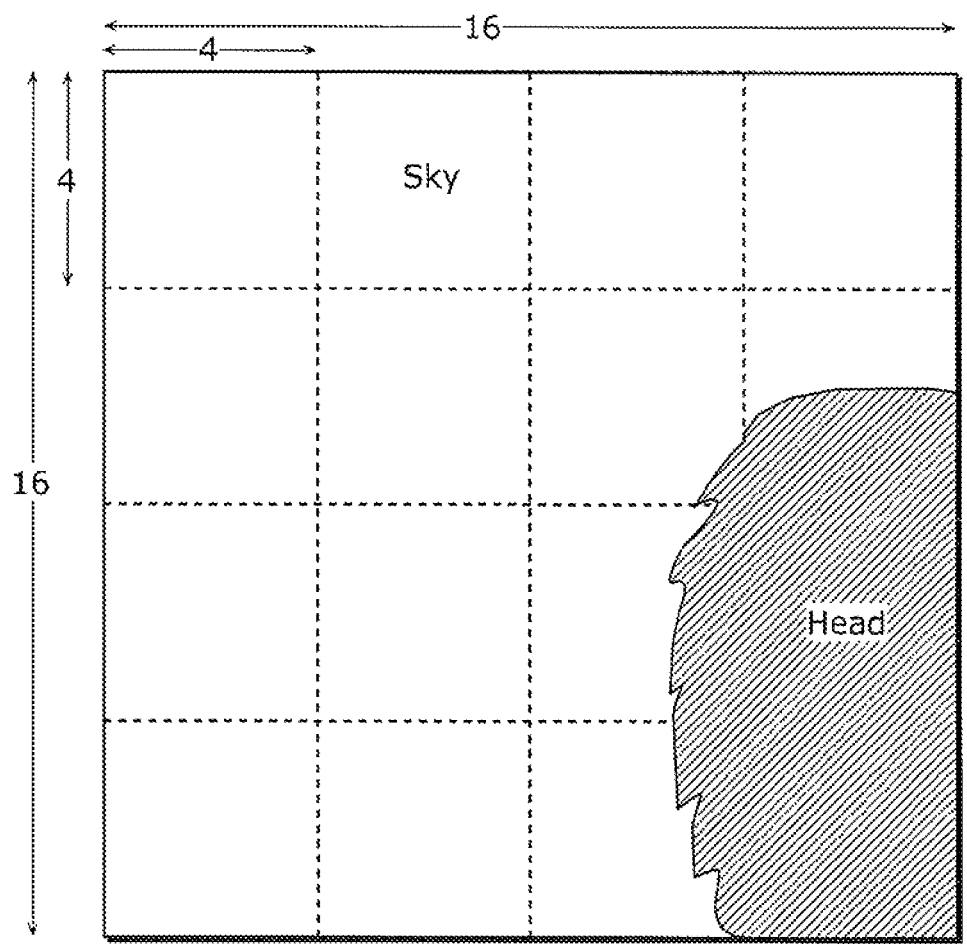
FIG. 8 is a diagram showing an example of an image with which the amount of generated code can be reduced more efficiently by performing an intra-prediction in units of 4×4 pixel blocks, when the number of 4×4 pixel blocks having a smaller luma variance is larger than the number of the 16×16 pixel blocks.

FIG. 8 is a diagram showing an example of an image which allows further reduction in the amount of generated code when intra-predicted in units of 4×4 pixel blocks, when there are a large number of 4×4 pixel blocks having a smaller luma variance than the 16×16 pixel MB. As shown in the figure, the 16×16 pixel MB is significantly larger in size than the 4×4 pixel block. In some cases, this results in the MB including, for example, an image of a human head or face having a high contrast with a smooth background such as the sky. If this is the case, the luma variance of the MB tends to be a large value due to an influence of a high-contrast image included in the MB. In contrast, in the 4×4 block, even in the background and in the image of the human head, the luma is smooth in a block other than the block including a boundary portion of images of the sky and the head, so that a larger number of blocks having a smaller luma variance is to be counted. In this case, it is possible to reduce a residual component with accuracy and suppress the amount of generated code by performing intra-prediction in units of 4×4 pixel block having a smaller luma variance rather than in units of the MB.

FIG. 9 is a diagram showing the luma of each pixel, on a horizontal line running across the image of the head in the 16×16 pixel MB showing the image in FIG. 8. The figure further shows, with a dotted line, how quantization noise at the edge portion spreads to an overall decoded image of the MB when performing, in a horizontal direction in the 16×16 pixel block size, intra-prediction coding on an image including an edge as shown in FIG. 8. Note that in FIG. 9, a vertical dashed line indicates a section between each the 4×4 pixel block from the left, and a solid line indicates a value of luma that is a pixel value of each pixel in the horizontal direction. In the figure, the luma of each pixel, from a left end into a rightward horizontal direction, indicates a constant high level (the luma representing the blue color of the sky) from a first pixel to an 11th pixel. In contrast, the luma of a 12th pixel from the left suddenly indicates a low level (the luma representing the black color of the head), and remains at a constant level up to a 16th pixel. Accordingly, the first 4×4 pixel block and the second 4×4 pixel block from the left have a constant luma and have a low value of variance accordingly, and the third 4×4 pixel block from the left includes an edge and has a large luma variance accordingly, and again the next fourth 4×4 pixel block has a constant luma and a low luma variance. In this case, when the edge that is the boundary between the image of the sky and the image of the head is included only in a vertical direction, it is possible to suppress the prediction residual at a low level by performing intra-prediction based on the 16×16 pixel prediction block size. However, as shown in the image of the head in FIG. 8, when the image of the head having a high contrast is part of the image within the MB, it is not possible to simply apply the vertical prediction direction as shown in FIG. 12(b). This is because the image as shown in FIG. 8 includes, for example, a horizontal edge in the 4×4 pixel block that is in a fourth column from the left and a second row from the top.

In the case of applying the horizontal intra-prediction coding based on the 16×16 block size on the image as shown in FIG. 8, the image, even when decoded, does not have a luma as indicated by the solid line in FIG. 9, but a quantization error generated for the edge within the 4×4 pixel block that is the third from the left, as indicated by the dashed line in FIG. 9, spreads to the first, the second, and the fourth 4×4 pixel block each of which is originally a smooth image having a smooth luma. This causes, in the decoded image, deterioration in image quality such as noise appearing due to influence of the quantization error is caused in the smooth image such as an expanse of the sky. In such a case, particularly, there is a problem that a defect in the image is more prominent due to the noise generated in the smooth image.

Thus, with the image as described above, by performing intra-prediction based on the 4×4 pixel block as the prediction block size, it is possible to suppress, within the range of the 4×4 pixel block, the noise generated in the decoded image as a result of the quantization error due to the edge, thus making it possible to obtain a smooth decoded image without prominent noise even when the quantization error is caused by the edge.

FIG. 10 is a flowchart for describing an example of processing for determining the prediction block size in the second embodiment. The following will describe a further detailed operation of the image coding apparatus according to the second embodiment, according to the flowchart shown in FIG. 10. First, as a premise, the control parameter 104 including a threshold Th(n) related to the number of blocks is previously stored in an external memory, and the parameter adjustment unit 1032 reads the threshold Th(n) from the external memory. In addition, as an initial value, the initial value of a register which counts the number of blocks is set to 0.

The block feature quantity calculating unit 102 calculates a luma variance of the MB (S901). Next, the block size determining unit 1031 calculates the luma variance of one of 4×4 pixel blocks within the MB (S902), and determines whether or not the calculated luma variance of the 4×4 pixel block is smaller than the luma variance of the MB which is calculated by the block feature quantity calculating unit 102 (S903). When the luma variance of the 4×4 pixel block is smaller than the luma variance of the MB (Yes in S903), the value in the register that counts the number of blocks is incremented by one (S904), and when the luma variance of the 4×4 pixel block is equal to or higher than the luma variance of the MB (No in S903), the processing in S904 is skipped, and a luma variance is calculated for the next 4×4 pixel block (S902). Thus, the block size determining unit 1031 sequentially compares, for every 4×4 pixel block in the MB, the luma variance of the MB and the luma variance of the 4×4 pixel block, and counts the number of 4×4 pixel blocks having a luma variance smaller than the luma variance of the MB.

After counting up the number of all the 4×4 pixel blocks included in the MB and having a smaller luma variance than the luma variance of the MB, the block size determining unit 1031 determines whether or not the counted number of the blocks is equal to or smaller than the threshold Th(n) obtained from the parameter adjustment unit 1032 (S905). When the counted number of blocks is smaller than the threshold Th(n) (Yes in S905), it is determined to perform intra-prediction in the 16×16 pixel MB size (S906). When the counted number of blocks is above the threshold Th(n) (No in S905), it is determined to perform intra-prediction in the 4×4 pixel block size (S907).

By the processing described above, even when one MB includes a high-contrast image of a human head, face, or the like with a smooth image as a background such as the sky, it is possible to determine the prediction block size that allows reducing the prediction residual with accuracy.

In other words, in the image coding apparatus according to an implementation of the present invention, when the size determining unit selects the 16×16 pixel block size, the feature quantity calculating unit further calculates, for all the 4×4 pixel blocks included in the current macroblock, a variance value based on the pixel values of the pixels belonging to the 4×4 pixel bock, and the size determining unit compares the variance value calculated for the 16×16 pixel block and the variance value calculated for each of the 4×4 pixel blocks, and selectively switches between the 16×16 pixel block and the 4×4 pixel block based on the result of the comparison.

Accordingly, even when the block size determining unit already selects the 16×16 pixel block size, the block size determining unit is further capable of: counting, for each 4×4 pixel block included in the current macroblock, a total number of 4×4 pixel blocks having a smaller variance of pixel values than the variance of pixel values in the current macroblock, and selecting the 16×16 pixel block size when the counted number of the 4×4 pixel blocks is equal to or smaller than a predetermined number, and selecting the 4×4 pixel block size when the counted number of the 4×4 pixel blocks is above the predetermined number. With this, even when the 16×16 pixel block size is once selected, it is possible to determine whether or not it is more appropriate, for the image, to perform intra-prediction coding on the current macroblock in the 4×4 pixel prediction block size, thus allowing performing the intra-prediction coding based on the 4×4 pixel prediction block size where appropriate. As a result, this allows reducing, with accuracy, the amount of code generated by the intra-prediction coding, and also preventing the noise due to the quantization error from spreading to the entire decoded image in the current macroblock, thus allowing obtaining a decoded image that is closer to the input image.

In addition to this, as with the method described in the first embodiment above, an offset of the luma variance of the 4×4 pixel blocks may be adjusted in conjunction with the quantization parameter QP. Specifically, an offset (n) adjusted in conjunction with the quantization parameter QP in S902 in FIG. 10 may be added to the luma variance of the 4×4 pixel blocks, and the luma variance of the 4×4 pixel blocks to which the offset (n) is added may be compared with the luma variance of the MB in S903. Thus, by setting the offset to the luma variance of the 4×4 pixel blocks in conjunction with the quantization parameter QP, it is possible to increase the probability (frequency or ratio) of selecting the 16×16 pixel MB size.

In addition, as an index to be used in the block size determining unit 1031, a luma variance of the MB has been given as an example, but a variance of chroma may be used, or it is possible to determine the block size by determining, as shown in FIG. 4, whether or not the pixel value (luma and chroma) is smooth, or whether a gradation or an edge is included, using the sum of absolute differences between adjacent pixels in chroma and such a feature quantity as an adjacent-pixel difference which considers the sign of plus or minus of chroma.

Embodiment 3

In addition, in the first embodiment described above, the method of controlling, in accordance with the quantization parameter, the size of the intra-prediction block that is a unit for intra-prediction coding has been described. Specifically, the first embodiment has descried, as an example, a method of controlling the threshold in conjunction with the quantization parameter QP such that the larger the quantization parameter is, the more likely the larger intra-prediction block having a larger block size is to be selected as the quantization parameter, and the second embodiment has described the method of controlling the offset to the luma variance of the 4×4 pixel block, but the present invention is not limited to these examples. In the third embodiment, the control is performed, based on a value of a buffer simulation of a decoder model, such that a multiplier for multiplying the threshold increases as a buffer occupancy of the coded data on the decoder side approaches an underflow level. In this buffer simulation, for example, the amount of code that is actually generated by the context-adaptive variable length coding (CAVLC) within an immediately-preceding coded picture is used. In addition, Variable Bit Rate (VBR) is adopted for controlling data transfer to the buffer that is performed by the rate control unit 106.

FIG. 11 is a diagram for describing the control of the amount of code generated in the buffer simulation of the decoder. More specifically, as shown in FIG. 11, a vertical axis indicates the occupancy amount of the coded data in the buffer, and a horizontal axis indicates time. In the buffer at the decoder side, the coded data that is read from an external medium, network, or the like is stored at a constant bit rate. On the other hand, the decoder, as indicated by an upward arrow in the figure, reads the coded data to be decoded virtually instantly, and decodes the read data on a per-picture basis. Note that it is not possible, in practice, to instantly read the coded data from the buffer as shown in the figure, but the simulation is performed assuming that the reading is instantly performed. Therefore, when a picture having a large amount of code is selected as the picture to be decoded when the buffer holds a small amount of coded data, the large amount of coded data is read at a time, thus causing an underflow. As a result, due to shortage of data of one picture from which coded data is not correctly read, a problem such as image collapse or frame dropping is caused. In addition, when the reference picture drops due to such an underflow, the drop causes a problem of suspension of decoding until the next IDR picture or I picture. In the digital versatile disc (DVD), a Blu-ray disc (BD), or the like for which the VBR control is adopted, the case of overflow is not a problem because it is only necessary to stop the data transfer when the buffer becomes full. In contrast, in the case of broadcasting which does not allow suspension of the data transmission, since the constant bit rate (CBR) control is adopted, the same problem in the case of underflow is also caused in the case of overflow. For both cases of underflow and overflow, a method which has conventionally been adopted is: suppressing the amount of generated code, suspending the reading of the coded data from outside when the remaining amount of data to be coded in the buffer reaches the upper or lower control line, and so on In contrast, in order to solve such inconvenience, according to the third embodiment, when the remaining amount of data within the buffer reaches the control line, the multiplier of the threshold is increased to suppress the amount of generated code so as not to cause an underflow, thus increasing the probability of selecting the 16×16 pixel prediction block size.

Note that here the control is performed such that the smaller the remaining amount of coded data within the buffer is, the more likely the 16×16 pixel prediction block size is to be selected, and the smaller the remaining amount of coded data is, the larger the multiplier of the threshold is set; however, instead of increasing the multiplier of the threshold, the control may be performed to increase the threshold as the amount approaches an underflow, with a control line divided into some stages based on a correspondence relationship between the quantization parameter QP and each of the thresholds 0 to 3 as shown in the first embodiment. For example, the parameter adjustment unit 1032 may hold, in form of a lookup table or the like, a list indicating a correspondence relationship between the remaining amount of coded data within the buffer and the threshold. Then, the threshold according to the remaining amount of coded data in the buffer for performing intra prediction on the current MB may be read from the table, the threshold that is read and the luma variance of the current MB may be compared, and the prediction block size of the current MB may be determined based on the result of the comparison. In addition, by combining the first and the third embodiments, a threshold may be previously determined according to the remaining amount of coded data in the buffer and the threshold according to the quantization parameter at the time. Thus, by determining the prediction block size of the current MB using the threshold that is determined to increase as the remaining amount of coded data in the buffer decreases, it becomes more likely to select a larger block size as the remaining amount of the coded data in the buffer is smaller, thus suppressing the amount of generated code in the next picture and producing an advantageous effect of quickly returning, to an appropriate amount, the remaining amount of coded data in the buffer.

Alternatively, for all the pictures that have been coded, the threshold or the increment in the threshold may be increased as an average amount of generated code for each picture increases with respect to the target amount of code. Since this setting allows the threshold or the increment in the threshold to increase as the amount of generated code for each picture increases beyond the target amount of code, the 16×16 MB block size is more likely to be selected as the prediction block size, thus producing an advantageous effect of timely reducing the amount of generated code.

Note that in the embodiments above, in the buffer simulation, the block size for intra-prediction has been determined based on the actual amount of generated code by CAVLC, but the present invention is not limited to this; for example, the block size may be determined based on the actual amount of generated code by context-based adaptive binary arithmetic coding (CABAC). In addition, according to the present invention, it is not necessary to determine the block size based on the amount of code that is actually generated, but the prediction block size may be determined based on the amount of data generated in an intermediate state of the coding, such as binary data before arithmetic coding, instead of the actual amount of generated code. Furthermore, the amount of generated code may be estimated from the binary data, and the prediction block size may be determined based on the estimated amount of code. Thus, performing the rate control based on the amount of data in the intermediate state has an advantage of allowing more real-time control of the amount of generated code rather than performing the rate control based on the actual amount of generated code after arithmetic coding such as CABAC that requires a larger amount of calculation.

Note that in the third embodiment, the case of buffer simulation based on the data transmission by VBR control has been described, but the present invention is also applicable to the case of data transfer by CBR control. In the case of CBR control, since an overflow is not supposed to be generated as well, the prediction block size is adaptively selected so as not to generate an overflow. Specifically, the control is performed such that the 16×16 pixel prediction block size is less likely to be selected by, for example, decreasing the threshold as the remaining amount of code in the buffer approaches an overflow.

Furthermore, along with the increase in the amount of generated code in pictures immediately preceding the current picture, that is, a predetermined number of coded pictures that are already coded immediately before the coding of the current picture, the threshold may be calculated by increasing a coefficient in the arithmetic expression for calculating the threshold. In addition, it is possible to control the threshold using these thresholds singly or in multiple combination. For example, an average between the threshold that is set according to the quantization parameter QP and the threshold that is set according to the remaining amount of coded data in the buffer may be calculated, and the average thus calculated may be determined as the threshold.

Furthermore, in the present embodiment, the control has been performed through control of the threshold based on the amount of generated code such that the 16×16 pixel prediction block size is more likely to be selected as the amount of generated code increases, but the present invention is not limited to this. For example, according to the amount of generated code in the buffer simulation, a lookup table is prepared which indicates the correspondence relationship between the luma variance of the current MB and the prediction block size to be selected corresponding to the luma variance. In other words, it goes without saying that: by preparing a table that is determined such that the 16×16 prediction block size is more likely to be selected for a lower luma variance as the amount of generated code in the simulation increases, the prediction block size corresponding to the luma variance may be selected for each amount of generated code according to the simulation, with reference to the lookup table corresponding to the amount of generated code.

In addition, it goes without saying that the first, the second, and the third embodiments described above can be performed in arbitrary combination as long as they are consistent with each other. In other words, the present invention is not limited to the embodiments above, and various modifications and variations are possible without departing from the scope of the present invention.

The embodiments disclosed here should not be considered as limitative but should be considered as illustrative in every aspect. The scope of the present invention is represented not by the description above but by the claims, and all the variations are intended to be included within the meaning and scope equivalent to the claims.

Note that each of the function blocks in each block diagram (FIG. 1, FIG. 2, and so on) is typically realized as an LSI that is an integrated circuit. These functions may be separately configured as a single chip, or may be configured as a single chip that includes part or all of these functions. For example, a function block other than a memory may be configured into a single chip.

The LSI here may also be called an IC, a system LSI, a super LSI, or an ultra LSI, depending on the degree of integration.

In addition, the integration method is not limited to the LSI, but may also be realized as a dedicated circuit or a general-purpose processor. After manufacturing the LSI, a field programmable gate array (FPGA) that allows programming or a reconfigurable processor in which connections of circuit cells and settings within the LSI are reconfigurable may be used.

Furthermore, when another integrated circuit technology appears to replace the LSI as a result of development of the semiconductor technology or some derivative technique, these function blocks may naturally be integrated using the technology. The possibility of application of bio technology can be considered.

In addition, among these functions, only a unit for storing the data to be coded or decoded may have a separate configuration instead of being integrated into the single chip.

An image coding apparatus and an image coding method according to the present invention are applicable for use intended for coding video data in accordance with Main profile or Baseline profile in H.264, broadcasting the coded video data, uploading or recording the coded video data to a server apparatus on a network, and are also applicable to a broadcasting apparatus, a recording apparatus, a cellular information terminal, and so on.

The invention claimed is:

1. An image coding apparatus which performs intra-prediction coding on a macroblock to be coded in an input image, in units of an intra-prediction block in a plurality of sizes, the image coding apparatus comprising:
    a feature quantity calculator configured to calculate, based on pixel values of pixels in the current macroblock in the input image, a variance of the pixel values of the pixels in the current macroblock and one of (i) a sum of absolute differences in pixel value between each of the pixels and an adjacent pixel in the current macroblock and (ii) an adjacent-pixel difference which is a difference between each of the pixels and the adjacent pixel, as statistical information of each of the pixel values;
    a size determiner configured to select a 16×16 pixel block size as an intra-prediction block size when it is determined that the calculated variance is smaller than a predetermined reference, and to determine whether to select between the 16×16 pixel block size or a 4×4 pixel block size as the intra-prediction block size based on the sum of absolute differences or the adjacent-pixel difference, when it is determined that the calculated variance is larger than the predetermined reference; and
    an encoder configured to perform the intra-prediction coding on the current macroblock, in units of the intra-prediction block having the determined size.

2. The image coding apparatus according to claim 1, further comprising
    a rate controller configured to generate rate control information for controlling an amount of generated code of a signal output from the encoder,
    wherein the size determiner is configured to determine, from the rate control information generated by the rate controller, a degree of suppression of the amount of generated code, and to control the predetermined reference, in conjunction with the degree of suppression that is a result of the determination, such that, for the same statistical information, a larger intra-prediction block size is more likely to be selected.

3. The image coding apparatus according to claim 2,
    wherein the size determiner is configured to control the predetermined reference such that, for the same statistical information, the larger a quantization parameter is, the more likely the larger intra-prediction block size is to be selected, the quantization parameter being indicated by the rate control information generated by the rate controller.

4. The image coding apparatus according to claim 2,
    wherein the size determiner is configured to control the predetermined reference, in conjunction with a buffer occupancy of coded data in a decoding-simulation buffer, such that, for the same statistical information, the larger intra-prediction block size is more likely to be selected as the buffer occupancy approaches an underflow, the buffer occupancy being generated as the rate control information by the rate controller.

5. The image coding apparatus according to claim 1,
    wherein the feature quantity calculator is further configured to calculate, for each of 4×4 pixel blocks included in the current macroblock, a variance based on the pixel values of pixels belonging to each of the 4×4 pixel blocks, when the 16×16 pixel block size is selected by the size determiner, and
    the size determiner is configured to compare the variance calculated for the 16×16 pixel block and the variance calculated for each of the 4×4 pixel blocks, and to selectively switch between the 16×16 pixel block size and a 4×4 pixel block size, based on a result of the comparison.

6. An image coding method for performing intra-prediction coding on a macroblock to be coded in an input image, in units of an intra-prediction block in a plurality of sizes, the image coding method comprising:
    calculating, based on pixel values of pixels in the current macroblock in the input image, a variance of pixel values of pixels in the current macroblock and one of (i) a sum of absolute differences in pixel value between each of the pixels and an adjacent pixel in the current macroblock and (ii) an adjacent-pixel difference which is a difference between each of the pixels and the adjacent pixel, as statistical information of each of the pixel values;
    selecting a 16×16 pixel block size as an intra-prediction block size when it is determined that the calculated variance is smaller than a predetermined reference, and determining whether to select between the 16×16 pixel block size or a 4×4 pixel block size as the intra-prediction block size based on the sum of absolute differences or the adjacent-pixel difference, when it is determined that the calculated variance is larger than the predetermined reference; and performing the intra-prediction coding on the current macroblock, in units of the intra-prediction block having the determined size.

\* \* \* \* \*